United States Patent

[11] 3,532,075

| [72] | Inventor | Norman Cooper<br>116 Benson St., West Haverstraw, New York 10993 |
|---|---|---|
| [21] | Appl. No. | 788,730 |
| [22] | Filed | Jan. 3, 1969 |
| [45] | Patented | Oct. 6, 1970 |

[54] WEEK-END PET FEEDER
8 Claims, 2 Drawing Figs.

| [52] | U.S. Cl. | 119/51.12 |
|---|---|---|
| [51] | Int. Cl. | A01k 5/02 |
| [50] | Field of Search | 119/51, 51.11, 51.12 |

[56] References Cited
UNITED STATES PATENTS

| 600,056 | 3/1898 | Askew | 119/51.12 |
|---|---|---|---|
| 641,920 | 1/1900 | Askew | 119/51.12 |
| 2,100,284 | 11/1937 | Kriechbaum | 119/51.11X |
| 3,330,256 | 7/1967 | De Vaun | 119/51.12 |

*Primary Examiner*—Aldrich F. Medbery
*Attorney*—Aaron B. Karas

ABSTRACT: A week-end pet feeding device having two feed compartments controlled by a single timing device which permits access to each compartment at a preselected time within a forty-eight hour period.

Patented Oct. 6, 1970

3,532,075

NORMAN COOPER
INVENTOR.

WEEK-END PET FEEDER

THE INVENTION

This invention relates to pet feeding devices and more particularly to an improved form thereof which can be set to expose the food at a given time and which includes means by which the food so placed in the device is maintained in good condition.

The invention is broadly directed to a device of the indicated character in which the cover for a food container which is normally moved to an open position, is retained in closed relation to the food container by a latch which is actuated by time controlled release means.

Although automatic feeding of farm animals has become widely used in recent years, there is no simple inexpensive device available which would permit the owner of a pet to feed automatically. While generally the feeding of a pet presents no problem to the owner, frequently weekend trips can become a problem if the owner is unable to take the pet along or find someone to care for it. The present invention provides a means by which the pet may be left at home for a weekend with no inconvenience to the owner.

An object of the present invention is to provide a timed pet feeding device which is so constructed and arranged that a series of pretimed feedings can be programmed to permit the pet to be fed automatically on one or more days.

A further object of the present invention is to provide a timed pet feeding device which may be preset to open and permit access to the food and while closed protects the food from vermin or insects.

With the foregoing objects in mind and with such other objects and advantages as may subsequently become apparent, reference is now made to the following specification in which the invention is set forth in greater detail and to the accompanying drawings illustrating a preferred embodiment of the invention and in which.

Figure 2:
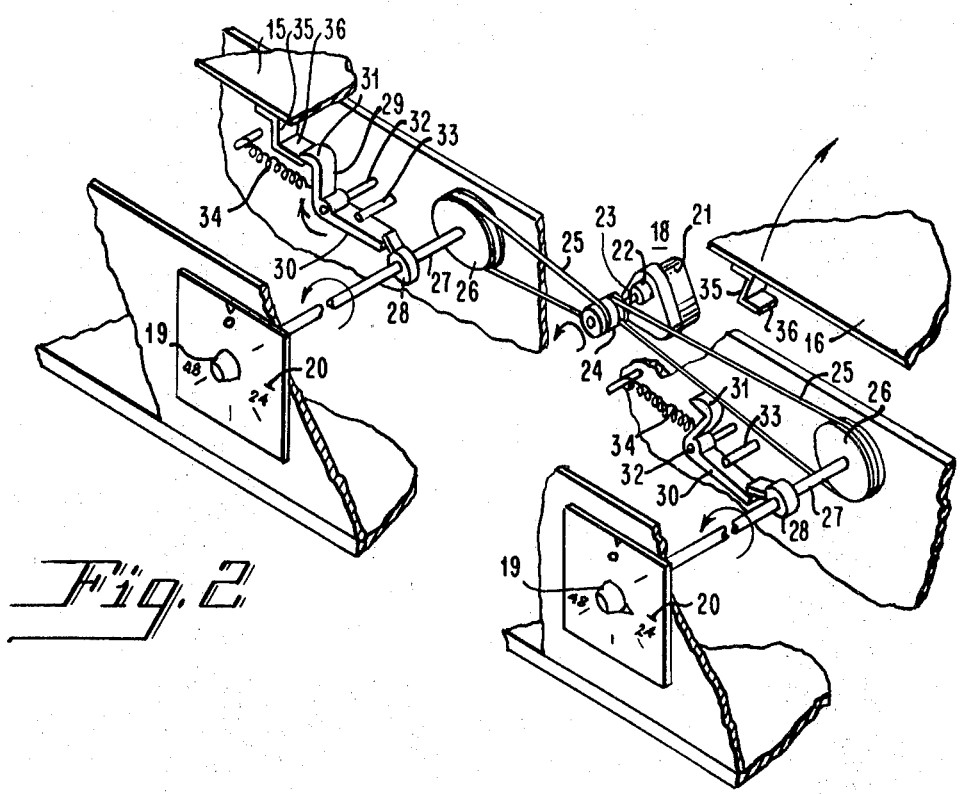
FIG. 2 is an exploded, cutaway perspective view of the present invention of FIG. 1 showing the timing device lock arrangement in both the locked and unlocked positions.
Figure 1:
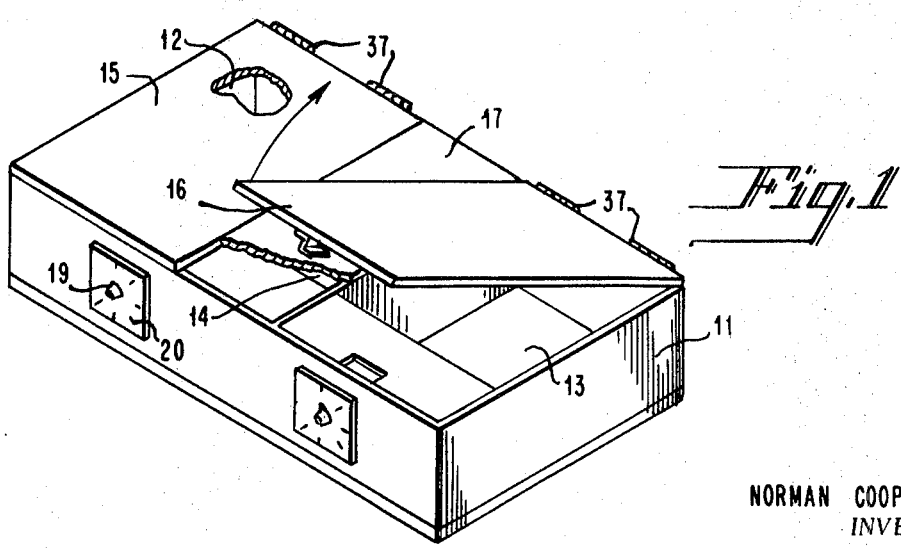
FIG. 1 is a perspective view of the present invention.

Referring to the drawings, the device 11 comprises a pair of feed compartments 12 and 13 separated by a timing control compartment 14. Feed compartments 12 and 13 are provided with liftable covers 15 and 16, respectively, which are connected to the compartments with spring loaded hinges 37. Timing control compartment 14 is protected by cover 17, said covered compartment containing timing control mechanism 18. Cover 17 is removable to provide access to timing mechanism 18 in the event repairs are necessary. The front faces of feed compartments 12 and 13 are provided with a timing control dial 19 and timing control knob 20 which permit the user to set the desired time sequence for opening of feed compartments 12 and 13.

The timing control mechanism 18 shown in detail in FIG. 2 comprises an electric motor 21 attached to a gear box 22 which contains a gear arrangement capable of rotating shaft 23 at a speed of one revolution per day (manufactured by CONRAC Corporation, Old Saybrooke, Conn.). Attached to shaft 23 is a pair of one-half-inch V-groove pulleys 24. V-groove pulleys 24 are attached by a one-quarter-inch round belt 25 to 1½-inch V-groove pulleys 26, one located in feed compartment 12 and the other in feed compartment 13. V-groove pulley 26 is mounted on a shaft 27 supported by appropriate shaft bearings (not shown). Shaft 27 also has mounted thereon trip lever 28 which is aligned to operably engage the cam of latch lock 29. Latch lock 29 is comprised of cam 30, latch lock lip 31 and latch lock fulcrum 32 around which both latch lock cam 30 and latch lock lip 31 rotate. The degree of rotation around latch lock fulcrum 32 by latch lock cam 30 and latch lock lip 31 is limited by cam stop 33 and spring 34. Latch lock 29 is aligned to operably engage and disengage cover latch lip 36 of cover latch 35. The operating mechanisms for both feed compartments as shown are identical.

In operation, the user loads compartments 12 and 13 respectively with a daily ration of food for the pet to be fed and then closes liftable covers 15 and 16 so that cover latch lip 36 engaged latch lock cam 31, preventing the cover from opening. The food, preferably for ease of cleaning, is placed within removable receptacles which are then placed in compartments 12 and 13. The timing device is set by rotating control knob 19 counterclockwise to the appropriate time position on control dial 20. When timing shaft 23 rotates at one revolution per day, setting the control knob 240° from zero, reading clockwise, will permit one compartment to open after 48 hours since the 1½-inch V-groove pulley will rotate 240° in 48 hours. Timing control dial 19 may be marked in hours to facilitate use by the pet owner. Setting the control knob 19 on the second compartment at 120° from zero, reading clockwise, permits the second compartment to open 24 hours after start. Thus, the V-groove pulley arrangement provided permits a 5° per hour rotation of shaft 27. After both control knobs are set and the unit starts, motor 21 drives timing shaft 23 and pulley 24 through an appropriate gear arrangement in gear box 22 at a rate of one revolution per day. The timing shaft 23 is rotated counterclockwise by gear box 22 and motor 21. Counterclockwise rotation permits setting the control knob 19 so that when set, the number on the face of control dial 20 to which the pointer on knob 19 points, shows the number of hours after setting that the cover of the compartment will open.

As timing shaft 23 rotates at a speed of one revolution per day, it drives belt 25 which in turn drives V-groove pulley 26 which causes shaft 27 to rotate at a rate of 5° per hour.

As the timing control reaches the preselected time which, with the pulley and gear arrangement described can be up to 48 hours or 240°, the control knob 19 will be pointing to zero on control dial 20. Latch lock cam 30 of latch lock 29 will have been moved downwardly in a clockwise direction by trip lever assembly 28 causing latch lock lip 31 to move upwardly in a clockwise direction around latch lock fulcrum 32 thus disengaging latch lock lip 31 from cover latch lip 36 of cover latch 35. Upon disengagement of cover latch lip 36, cover 15 or 16 is caused to spring open by spring hinges 37. As soon as trip lever assembly 28 clears latch lock lip 31 and cover latch lip 36 springs open, latch lock 29 is returned to the engaged position by latch lock spring 34 which pulls latch lock lip 31 in a counterclockwise direction until latch lock cam 30 is stopped by cam stop 33 which may be fastened to the front wall of feed compartments 12 and 13.

Although the round belt 25 permits positive drive of the pulleys while also facilitating disengagement when control knob 19 is being set by rotating timing control knob 20 in a counterclockwise direction, it will be apparent that other drive methods, although less preferable could also be employed.

While not shown, it will be understood that if desired, covers 15 and 16 can be provided with gaskets to furnish greater protection of the food held in the device.

Although the present invention has been described by means of the foregoing exemplary structures shown, it will be apparent that certain other structural modifications could conceivably be made while still embodying the principles of this inventive concept. These modifications are deemed to be part of the present invention which is limited only by the scope of the following claims and reasonably equivalent structures to those defined therein.

I claim:

1. A pet feeding device comprising at least two food compartments with open tops, each of said compartments having a cover hingedly connected to said compartment, means for raising said cover, a cover latch lock and latch lock release means operably connected by pulley and belt means to a timing mechanism, latch lock releasing means operably connected to said pulley and having means for contacting said latch lock, each of said latch locks having means for being set individually for sequentially opening said compartments at a preselected time.

2. The pet feeding device according to claim 1 wherein the two food compartments are separated by a compartment containing the timing mechanism, said compartment having a closed top.

3. The pet feeding device according to claim 2 wherein the cover raising means is comprised of spring hinges.

4. The pet feeding device according to claim 2 wherein said covers are provided with gasket means to sealably close said food compartments.

5. The pet feeding device according to claim 4 wherein the cover raising means is comprised of spring hinges and each of said food compartments has a timing control knob operably connected to the cover latch lock to enable the user to preselect the time of opening.

6. The pet feeding device according to claim 5 wherein the belt means is comprised of at least a pair of round belts.

7. The pet feeding device according to claim 6 wherein the device has means that can be set to feed pets at any time interval between 0 and 48 hours.

8. The pet feeding device according to claim 1 wherein the timing mechanism is a one revolution per day timer.